United States Patent [19]
Payne

[11] 4,296,840
[45] Oct. 27, 1981

[54] TRACTOR PULL SLED

[76] Inventor: Richard J. Payne, R.R. #1, Box 293, Grand Island, Nebr. 68801

[21] Appl. No.: 83,748

[22] Filed: Oct. 11, 1979

[51] Int. Cl.³ .......................................... B62B 17/08
[52] U.S. Cl. ........................................ 188/8; 188/128
[58] Field of Search ...................... 188/8, 128, 2 R; 73/141

[56] References Cited

U.S. PATENT DOCUMENTS

| | | | |
|---|---|---|---|
| 1,592,182 | 7/1926 | Davidson et al. | 188/2 R X |
| 1,603,521 | 10/1926 | Davidson et al. | 188/2 R X |
| 3,491,590 | 1/1970 | Watkins | 73/141 R |
| 3,633,413 | 1/1972 | Case | 73/141 R |

*Primary Examiner*—Douglas C. Butler
*Attorney, Agent, or Firm*—Henderson & Sturm

[57] ABSTRACT

A tractor pull sled including a weighted pan movably supported on a frame intermediate the forward and rearward ends. The frame is supported by a plurality of ground engaging wheels, at least one of which is coupled to and actuates a pan support assembly which transfers the weight of the pan to the ground at a rate which is a function of the distance of forward travel of the sled. The pan support assembly also functions to transfer the weight of the frame onto the pan after the full weight of the pan has been applied to the ground.

18 Claims, 7 Drawing Figures

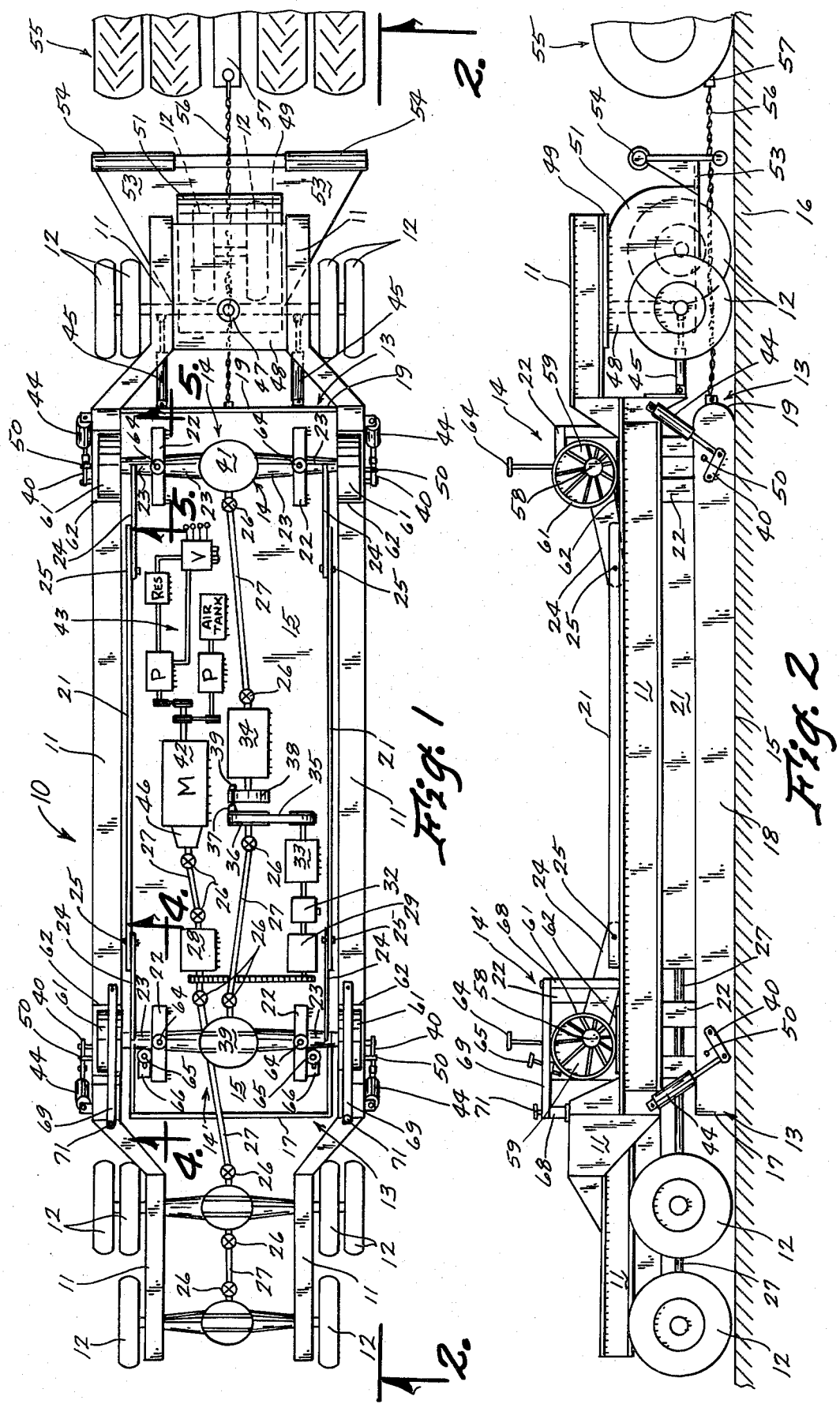

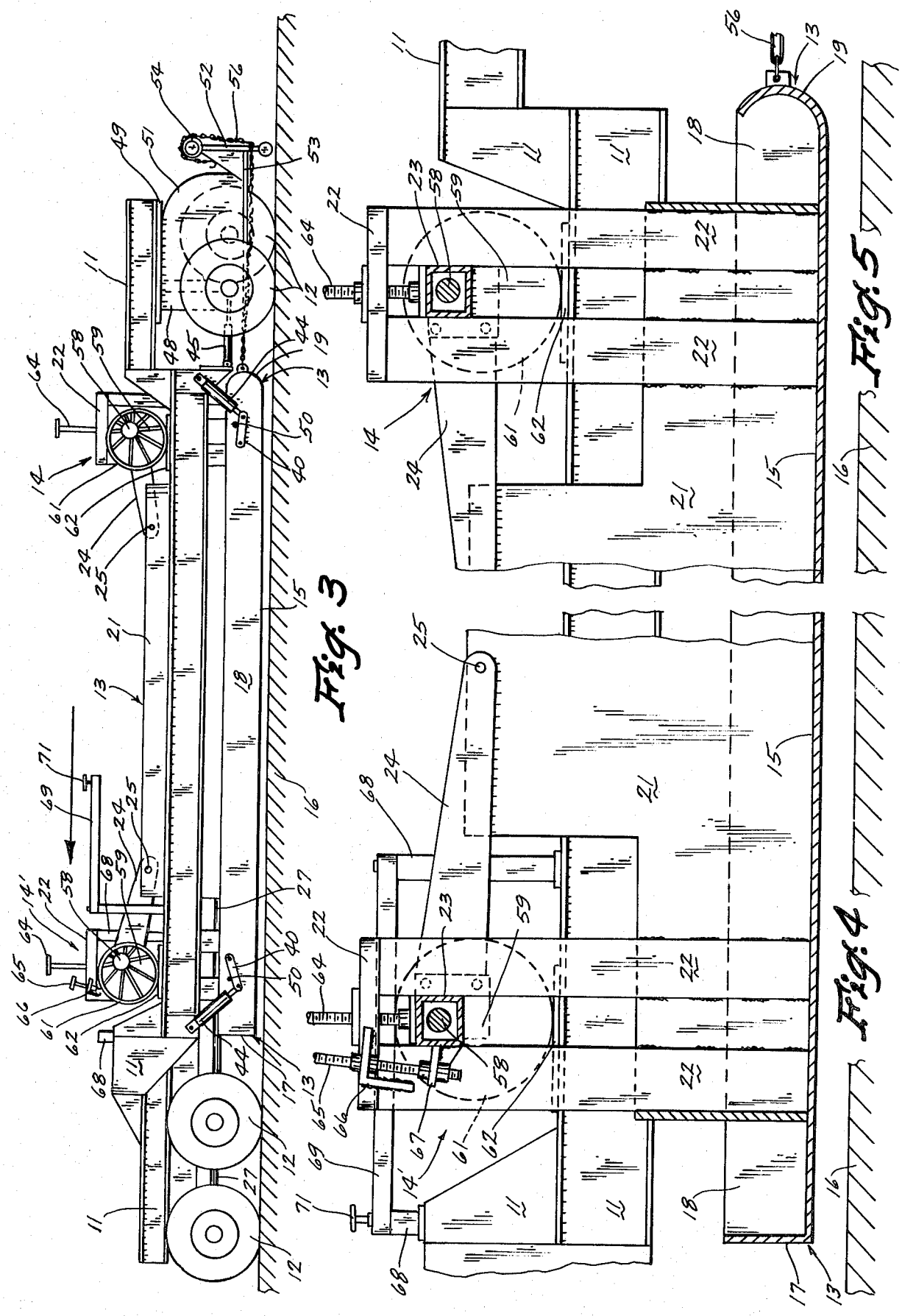

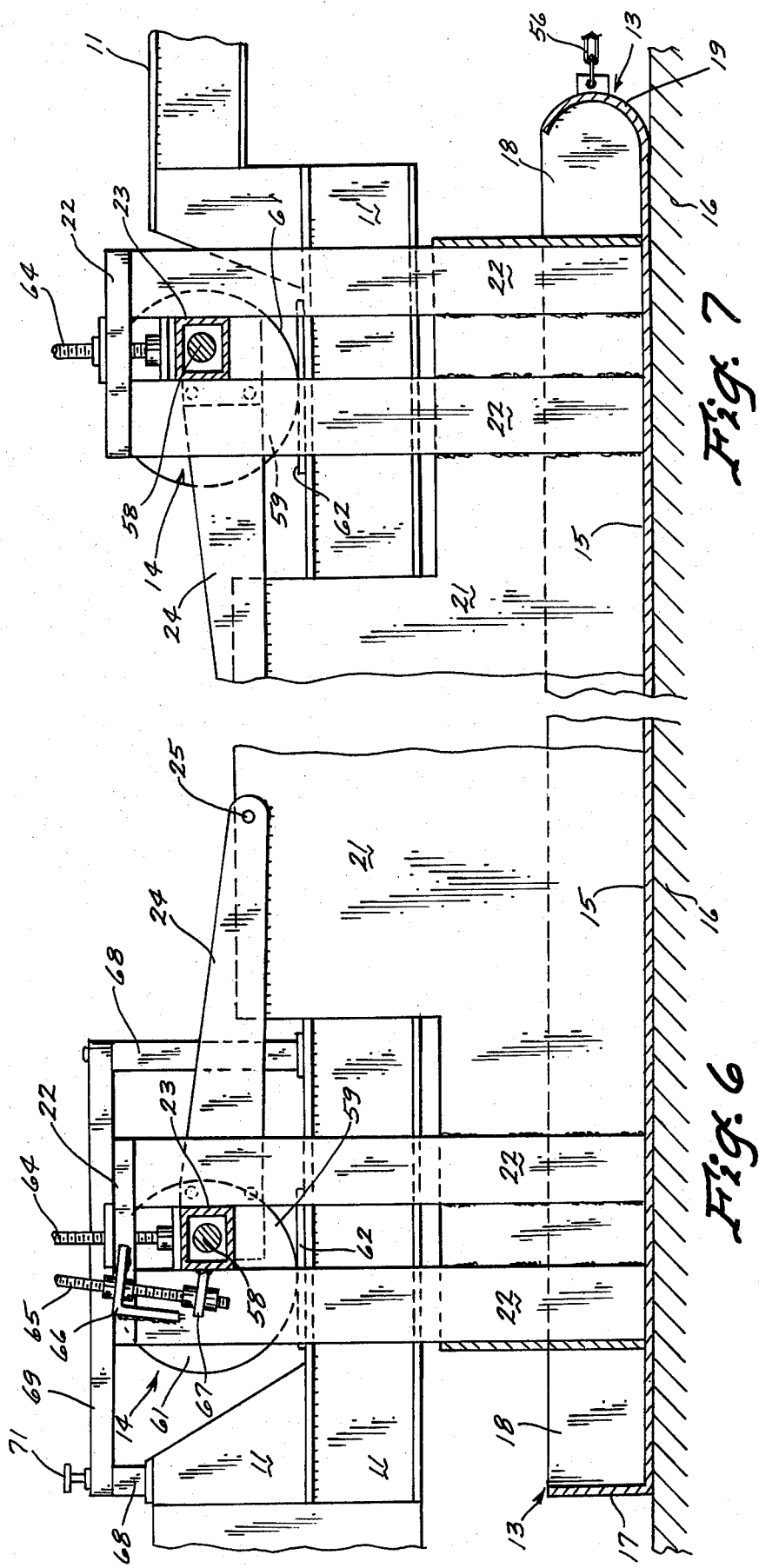

TRACTOR PULL SLED

BACKGROUND OF THE INVENTION

The present invention relates generally to tractor pull sleds and more particularly to a tractor pull sled wherein the weight of the pan is transferred vertically to the ground.

As tractor pulling has grown in popularity as a sport many devices have been used to measure the relative pulling power of competing tractors. One of the most critical problems associated with known pull sleds is the safety hazards presented by massive weights being moved by chains and cables horizontally in the direction of the competitors. When the tractor stalls and stops, the slack in the cable allows the weight to continue moving forward causing great forces to be exerted on the cable, sometimes resulting in mechanical failure. Another problem with known sleds is the variation in frictional resistance to pull exerted by the sled as use of the sled continues.

Those concerned with these problems recognize a need for an improved tractor pull sled.

SUMMARY OF THE INVENTION

The present invention discloses a tractor pull sled having a vertically movable weighted pan mounted on a frame supported by ground engaging wheels. A pan support assembly is mounted on the frame and is coupled to and actuated by the ground engaging wheels. The pan support assembly moves the pan from a first position, where the weight of the pan is supported by the frame, to a second position, where the weight of the pan is transferred to the ground, after which the pan support assembly functions to transfer the weight of the frame onto the pan.

Also provision of ground engaging wheels at both the forward and rearward ends, together with independently variable movement of the forward and rearward pan support assemblies, allows application of the weight of the pan to the ground in a completely controlled manner. For example, it may be desirable to maintain the front of the pan above the ground at the start of a pull to prevent the pan from digging into the track.

Further, provision of both forward and rearward wheels allows raising of the pan at the completion of a pull so that the sled can be backed up to the starting position under its own power which is generated by standard internal combustion engine.

An object of the present invention is the provision of an improved tractor pull sled.

Another object is to provide a tractor pull sled that is safe to operate.

A further object of the invention is the provision of a tractor pull sled wherein the variation in frictional resistance to pull exerted by the sled is minimized.

Still another object is to provide a tractor pull sled that is capable of utilizing its entire weight, including the weight of the frame, to provide frictional resistance.

A still further object is to provide a tractor pull sled usable with tractors having a wide range of pulling power.

Another object is to provide a tractor pull sled that is convenient to operate and minimizes the time lag between individual pulls.

Other objects, advantages, and novel features of the present invention will become apparent from the following detailed description of the invention when considered in conjunction with the accompanying drawings.

BRIEF DESCRIPTION OF THE DRAWINGS

FIG. 1 is a top plan view of the tractor pull sled of this invention, showing the coupling of the ground driven rear wheels to the pan support assemblies, and showing the engine used to power the accessories and to drive the sled rearward between pulls;

FIG. 2 is a side elevational view taken along line 2—2 of FIG. 1, showing the sled at or near the end of a pull wherein the weight of the frame has been transferred to the pan;

FIG. 3 is a side elevational view showing the pan of the sled raised and prepared for rearward movement to a designated starting point of the next pull;

FIG. 4 is a cutaway elevational view taken along line 4—4 of FIG. 1, showing the relationship of the frame and pan with respect to the rearward pan support assembly which also functions as a means for transferring the weight of the frame onto the pan;

FIG. 5 is a cutaway elevational view taken along line 5—5 of FIG. 1, showing the forward pan support assembly;

FIG. 6 is a cutaway elevational view similar to FIG. 4 showing the eccentric drum rotated to a position where the weight of the frame is transferred to the pan; and FIG. 7 is a cutaway elevational view similar to FIG. 5 showing the eccentric drum rotated to a position where the axle housing disengages from the adjustable stop of the pan collar.

DESCRIPTION OF THE PREFERRED EMBODIMENTS

Referring now to the drawings, wherein like reference numerals designate identical or corresponding parts throughout the several views, FIG. 1 shows the tractor pull sled 10 of this invention. The pull sled 10 generally includes a frame 11 supported at the forward and rearward ends by ground engaging wheels 12. A pan 13 is supported on frame 11 by a plurality of pan support assemblies 14 and 14' which will be described in greater detail hereinafter.

The pan 13 includes a horizontally disposed rectangular floor 15 which provides a massive frictional area when in contact with the ground 16. A rear wall 17, and sidewalls 18 extend upwardly from the edges normal to the floor 15, and front wall 19 extends upwardly therefrom to form a semicircle having a twelve inch diameter. A vertical support plate 21 is spaced inwardly from each of the sidewalls 18 and is attached to the floor 15. The space between the sidewalls 18 and plate 21 is filled with concrete, scrap iron, or other inexpensive material having a high density to increase the frictional resistance of the pan. A pair of upwardly extending U-shaped collars 22 are attached to the floor 15 at the front and rear of pan 13. As most clearly shown in FIGS. 4 and 5, the cavity of the collars 22 is adapted to receive the axle housing 23 of pan support assembly 14 and 14', and support arms 24 are rigidly attached to housing 23 and pivotally attached to plate 21 as at 25.

As shown in FIG. 1, the floor 15 of pan 13 carries the mechanism to drivably couple the ground engaging rear wheels 12 to the pan support assemblies 14 and 14', together with an engine used to power the accessories of the sled and to drive the sled rearward between pulls.

The ground engaging rear wheels 12 are drivably coupled by universal-joints 26 and drive shafts 27 to an idle box 28 which includes a reverse gear. Idle box 28 is in turn drivably connected to a first 5-speed transmission 29 by a chain or belt 31. Transmission 29 is coupled by a clutch 32 to a second 5-speed transmission 33 which in turn is connected to gear box 34 by a chain or belt 35. Chain or belt 35 is connected to a driven pulley 36 which has a protruding lug 37. Disc 38 has a plurality of openings (not shown) which accommodate pin 39. Pin 39 is engaged by lug 37 as pulley 36 rotates to the position of pin 39. Thus, the output of pulley 36 is directly transmitted to differential 39 of rear pan support assembly 14' by shaft 27, while the transmission of the output of pulley 36 to the front differential 41 may be varied by the placement of pin 39 and the setting of gear box 34. It can therefore be seen that the inputs to the differentials 39 and 41 can be varied by varying the settings of the transmissions 29 and 33; and the inputs to the differentials 39 and 41 can be independently varied by the positioning of pin 39 and the setting of gear box 34.

The floor 15 of pan 13 also supports an internal combustion engine 42 which powers the accessories including the hydraulic system 43 which is operably connected to the pan lifting hydraulic cylinders 44 and the steering cylinders 45. Engine 42 is equipped with an automatic transmission 46 which drivably connects engine 42 to the rear wheels 12 through idle box 28, thereby being adapted to power the sled 10 in a rearward direction. Prior to moving the sled 10 rearwardly, the pan 13 is raised (see FIG. 3) by actuating pan lifting cylinders 44. Each cylinder 44 is pivotally attached to one end to frame 11 and pivotally attached at the opposite end to one end of strap 40. The opposite end of strap 40 is pivotally attached to sidewall 18. As cylinder 44 is retracted, strap 40 moves from the position shown in FIG. 2 to the position shown in FIG. 3 where strap 40 contacts and exerts an upward force on tab 50 attached to sidewall 18, thereby raising pan 13.

The forward end of the frame 11 is supported by wheels 12 which are pivotally and removably attached to the frame by pin 47. The wheels 12 are adapted to be steered by actuation of one or more steering cylinders 45 which interconnect the wheels 12 and the pan 13. As shown in FIG. 1, the forward end of frame 11 includes a horizontally disposed flat plate 48 which is disposed in the vicinity of pin 47. A corresponding horizontal plate 49 forms the uppermost portion of housing 51 which encloses the forwardmost wheels 12. The contacting relationship of plates 48 and 49 stabilizes the forward end of frame 11 against wobbling when the wheels 12 are on uneven ground. A vertical guard plate 52 is attached to the forward end of housing 51 by walk plate 53 and an upper roller 54 prevents the pulling tractor 55 from backing over the guard plate 52 when backing up to attach chain 56 to the drawbar 57.

The pan 13 is movably mounted on the frame 11 by pan support assemblies 14 and 14'. Each of the pan support assemblies 14 and 14' include a differential, 41 and 39 respectively, coupled to the ground engaging rear wheels 12 as previously described. An axle 58 is enclosed in a housing 23 which extends through the cavity of collar 22 and is vertically aligned thereby. The free end of the axle 58 is eccentrically attached to a circular drum 59 which has an outer periphery 61 disposed in contacting relationship which an upper horizontal surface of a low friction plate 62 constructed of Teflon or another suitable material. The low friction plate 62 is rigidly attached to an upper horizontal surface of frame 11 as most clearly shown in FIGS. 4 and 5.

Referring now to FIGS. 5 and 7, the pan support assembly 14 shown at the forward end of the pan 13 is vertically aligned by cooperation of the housing 23 with the cavity of collar 22. An adjustable stop plate 63 extends downwardly within the cavity of collar 22 to contact the axle housing 23. The stop plate is adjusted by operation of a threaded rod 64, which threadably engages the top member of collar 22.

FIG. 5 shows the pan support assembly 14 in the starting position where the axle 58 is in the uppermost position with respect to the lower periphery 61 of the drum 59, and the axle housing 23 supports the pan in its highest position. As the drum 59 rotates about the axis of axle 58, the pan 13, supported by the contacting relationship of the axle housing 23 with the stop plate 63, is vertically lowered to the position shown in FIG. 7 where the axle housing 23 disengages from the stop plate 63 and the entire weight of the pan 13 is carried by the ground and is unsupported by the frame 11.

The pan support assembly 14', shown in FIGS. 4 and 6, is similar to the pan support assembly 14 but it differs in two important features. First, the axle housing 23 is rigidly and adjustably attached to the collar 23 by a threaded rod 65 which threadably engages both a projection 66 rigidly attached to collar 22 and a projection 67 rigidly attached to axle housing 23. Second, a releasable bracket 68 is attached to frame 11 and includes a horizontal bar 69 which is releasably held by threaded connector 71 in contacting relationship with the upper periphery 61 of drum 59.

FIG. 4 shows the position of the pan support assembly 14' at the start of a pull. As the drum rotates about the axis of axle 58, the pan 13 is vertically lowered with respect to the frame 11 until the entire weight of the pan 13 is supported on the ground. Since the downward movement of the pan support assembly is limited with respect to pan 13, due to the rigid attachment of the axle housing 23 to the collar 22, the periphery 61 of the drum 59 exerts an upward force on the horizontal bar 69 and transfers the weight of the frame 11 to the pan 13 as shown by FIG. 6.

In operation, the tractor pull sled 10 of this invention can be used for various classes of pulling tractors 55 since the starting weight of the pan 13 on the ground 16 can be adjusted by operation of the threaded rods 64 and 65. Also, the rate at which the pan 13 is lowered can be varied as previously described, and will be a function of the distance of forward travel of the sled 10 since the pan support assemblies 14 and 14' are coupled to and actuated by the rear ground wheels 12. Once the starting weight and rate of weight application has been determined, and the pan support assemblies 14 and 14' are in the positions shown in FIGS. 4 and 5, the pulling tractor 55 is attached directly to the pan 13 by chain 56. As the sled 10 is pulled forward greater weight is applied to the ground until the frictional resistance causes the pulling tractor 55 to stall thus terminating the pull.

To return the sled 10 to the designated starting position, the pan raising cylinders 44 are actuated and moved to the position shown in FIG. 3 and the horizontal bar 59 is then released and moved out of contact with the periphery 61 of drum 59. The idle box 28 is placed in reverse gear, the automatic transmission 46 is shifted to forward drive, and the steering cylinders 46 are actuated to guide the sled 10 as it moves rearwardly.

It is to be understood that all controls for operating the sled 10 could be centrally located in an operator's cab, and that the entire structure could be enclosed in an appropriate housing.

Thus, it can be seen that a novel tractor pull sled has been provided which accomplishes at least all of its stated objectives.

Obviously, many modifications and variations of the present invention are possible in light of the above teachings. It is therefore to be understood that, within the scope of the appended claims, the invention may be practiced otherwise than as specifically described.

I claim:

1. A tractor pull sled comprising:
   a frame having a forward end and a rearward end;
   a plurality of ground engaging wheels attached to and supporting said forward end and said rearward end;
   a pan movably mounted on said frame; said pan being movable between a first position wherein the weight of said pan is supported by said frame, and a second lowered position wherein said pan engages the ground and the weight of said pan is unsupported by said frame; and
   means for moving said pan between said first position and said second position at a rate which is a function of the distance of forward travel of said sled.

2. The tractor pull sled of claim 1 wherein said pan is mounted intermediate said wheels supporting said forward end and said wheels supporting said rearward end.

3. The tractor pull sled of claim 2 wherein the ground engaging wheels supporting the forward end are pivotally and removably attached to said frame.

4. The tractor pull sled of claim 3 wherein the forward end of said frame includes a horizontal plate disposed in the vicinity of the point of pivotal attachment, and wherein a corresponding horizontal plate forms the top of a housing enclosing said wheels, said plates being in contacting relationship, whereby the forward end of said pull sled is stabilized.

5. The tractor pull sled of claim 1 wherein said pan is weighted.

6. The tractor pull sled of claim 1 wherein said moving means includes:
   a pan support assembly mounted on said frame, said pan support assembly contacting and supporting said pan as said pan is moved between said first position, wherein the weight of said pan is supported by said frame, and said second position, wherein the weight of said pan in unsupported by said frame; and
   means for coupling said pan support assembly to said ground engaging wheels, whereby the pan is moved between said first position and said second position at a rate which is a function of the distance of forward travel of said sled.

7. The tractor pull sled of claim 6 wherein said pan support assembly disengages from said pan when said pan reaches said second position.

8. The tractor pull sled of claim 6 wherein said pan support assembly is rigidly and adjustably attached to said pan.

9. The tractor pull sled of claim 6 wherein said pan support assembly includes:
   an axle having a housing disposed in contacting relationship with said pan, said axle being rotated by said coupling means; and
   a circular drum eccentrically attached to said axle and rotated thereby, the lower periphery of said drum being disposed in contacting relationship to said frame as said drum is rotated.

10. The tractor pull sled of claim 6 wherein said coupling means includes means for varying the rate of movement of said pan.

11. The tractor pull sled of claim 10 wherein the rate of movement of the forward end of said pan and the rate of movement of the rearward end of said pan are independently variable.

12. The tractor pull sled of claim 1 further including: means for transferring the weight of said frame onto said pan when said pan is in said second position, wherein said weight is transferred at a rate which is a function of the distance of forward travel of said sled.

13. The tractor pull sled of claim 12 wherein the weight transferring means includes:
   a pan support assembly mounted on said frame and contacting and supporting said pan;
   means for coupling said pan support assembly to said ground engaging wheels;
   means for limiting the downward movement of the pan support assembly with respect to the pan when the pan reaches said second position; and
   means for connecting said frame to said pan support assembly such that forces exerted by said pan support assembly are exerted, upwardly upon said frame.

14. The tractor pull sled of claim 13 wherein said pan support assembly includes:
   an axle having a housing disposed in contacting relationship with said pan, said axle being rotated by said coupling means; and
   a circular drum eccentrically attached to said axle and rotated thereby, the lower periphery of said drum being disposed in contacting relationship to said frame as said drum is rotated.

15. The tractor pull sled of claim 14 wherein said limiting means includes rigid attachment of said housing to an upwardly extending collar rigidly attached to said pan.

16. The tractor pull sled of claim 15 wherein said frame connecting means includes a bracket rigidly attached to said frame, said bracket including a horizontal bar disposed in contacting relationship with the upper periphery of said drum.

17. A tractor pull sled comprising:
   a frame having a forward end and a rearward end;
   a plurality of ground engaging wheels attached to and supporting at least one of said ends;
   a pan movably mounted on said frame, said pan being movable in a direction normal to said frame between a first position wherein the weight of said pan is partially supported by said frame, and a second lowered position wherein the weight of said pan is unsupported by said frame, and wherein the weight of said frame is transferred to said pan;
   means for moving said pan between said first position and said second position at a rate which is a function of the distance of forward travel of said sled; and
   means for transferring the weight of said frame onto said pan when said pan is in said second position, wherein said weight is transferred at a rate which is a function of the distance of forward travel of said sled.

18. The tractor pull sled of claim 17 wherein the weight transferring means includes:
- a pan support assembly mounted on said frame and contacting and supporting said pan;
- means for coupling said pan support assembly to said ground engaging wheels;
- an axle having a housing disposed in contacting relationship with said pan, said axle being rotated by said coupling means; and
- a circular drum eccentrically attached to said axle and rotated thereby, the lower periphery of said drum being disposed in contacting relationship to said frame as said drum is rotated.

* * * * *